United States Patent [19]

Yamamoto et al.

[11] Patent Number: 4,723,619
[45] Date of Patent: Feb. 9, 1988

[54] COVER STRUCTURE FOR POWER TRANSMISSION DEVICE

[75] Inventors: Sadashi Yamamoto; Yasuo Ikenoya; Shigenaga Enoki, all of Saitama, Japan

[73] Assignee: Honda Giken Kogyo Kabushiki Kaisha, Tokyo, Japan

[21] Appl. No.: 844,793

[22] Filed: Mar. 27, 1986

[30] Foreign Application Priority Data

Mar. 27, 1985 [JP] Japan .................... 60-62988

[51] Int. Cl.$^4$ .............................. B62M 7/00
[52] U.S. Cl. .................. 180/219; 74/606 R; 474/144
[58] Field of Search .............. 180/219, 227, 230, 228, 180/231, 205, 206, 207; 74/606 R; 474/144, 146

[56] References Cited

U.S. PATENT DOCUMENTS

| | | | |
|---|---|---|---|
| 4,344,500 | 8/1982 | Kurata et al. | 180/230 |
| 4,374,549 | 2/1983 | Lacroix | 180/227 X |
| 4,468,979 | 9/1984 | Inagaki et al. | 74/606 R |

FOREIGN PATENT DOCUMENTS

| | | | |
|---|---|---|---|
| 59-34065 | 2/1984 | Japan | 74/606 R |
| 59-127596 | 8/1984 | Japan | |

Primary Examiner—John J. Love
Assistant Examiner—Charles R. Watts
Attorney, Agent, or Firm—Irving M. Weiner; Joseph P. Carrier; Pamela S. Burt

[57] ABSTRACT

There is disclosed a cover structure in a power transmission device comprising a casing having an open side, a driver shaft rotatably supported by the casing, a driven shaft rotatably supported by the casing and drivable by the driver shaft, a power transmission mechanism housed in the casing for transmitting rotative power from the driver shaft to the driven shaft, a starter mechanism housed in the casing and engageable with the driver shaft for starting an engine, and cover means covering the open side of the casing. The cover means comprises a plurality of cover members, a cover member which supports the starter mechanism being securely coupled to the casing, the remaining cover member or members being coupled to the casing through a resilient member or members.

2 Claims, 3 Drawing Figures

4,723,619

COVER STRUCTURE FOR POWER TRANSMISSION DEVICE

BACKGROUND OF THE INVENTION

1. Field of the Invention

The present invention relates to a cover structure for the power transmission device of a motorcycle or the like.

2. Discussion of the Relevant Art

Many motorcycles employ a belt-and-pulley power transmission device since the engine output power and the torque transmitted to the drive wheel are relatively small. The belt-and-pulley power transmission device generally comprises a driver pulley mounted on the output shaft of the engine, a driven pulley drivable by the driver pulley, and a belt for transmitting the rotative power from the driver pulley to the driven pulley. The belt-and-pulley power transmission device is housed in a casing installed on the rear portion of a motorcycle frame. The casing, which doubles as part of a crankcase, also accommodates a kick starter for the engine. The casing is of a fully closed construction with its opening covered by a case cover fastened by bolts to the casing. The casing is however disadvantageous in that it vibrates when the engine vibrates, and such vibration is transmitted to the case cover, generating undesired noise.

Various attempts have heretofore been made to prevent such vibration-induced noise. For example, Japanese Laid-Open Utility Model Publication No. 59/127956 discloses a casing with a case cover fixed thereto by bolts through a packing, the bolts being associated with vibro-isolating members of a resilient material. Each of the bolts has a flange to limit the inserted position of the bolt in the casing for thereby preventing the vibro-isolating member from being deformed under pressure.

The above arrangement is effective in reducing, to some extent, the noise arising from vibration of the case cover. However, the noise reduction capability of the conventional cover structure according to the above arrangement is insufficient since only the resilient vibro-isolating members are interposed between the case cover and the bolts. Additionally, the cover structure according to the above arrangement has another drawback in that its overall rigidity is greatly reduced because of the resilient vibro-isolating members, and hence an engine starter cannot be attached directly to the case cover.

SUMMARY OF THE INVENTION

It is an object of the present invention to provide a cover structure for a power transmission device, which sufficiently and effectively prevents noise arising from vibration of a case cover attached to the casing of the power transmission device.

Another object of the present invention is to provide a cover structure for a power transmission device, which allows an engine starter to be mounted on a case cover.

According to a preferred embodiment of the present invention, there is provided a cover structure in a power transmission device comprising a casing having an open side, a driver shaft rotatably supported by the casing, a driven shaft rotatably supported by the casing and drivable by the driver shaft, a power transmission mechanism housed in the casing for transmitting rotative power from the driver shaft to the driven shaft, a starter mechanism housed in the casing and engageable with the driver shaft for starting an engine, and cover means covering the open side of the casing, characterized in that the cover means comprises a plurality of cover members, the cover member which supports the starter mechanism being securely coupled to the casing, the remaining cover member or members being coupled to the casing through a resilient member or members.

The above and further objects, details and advantages of the present invention will become apparent from the following detailed description of a preferred embodiment thereof, when taken in conjunction with the accompanying drawings.

DETAILED DESCRIPTION OF THE PREFERRED EMBODIMENT

Figure 1:
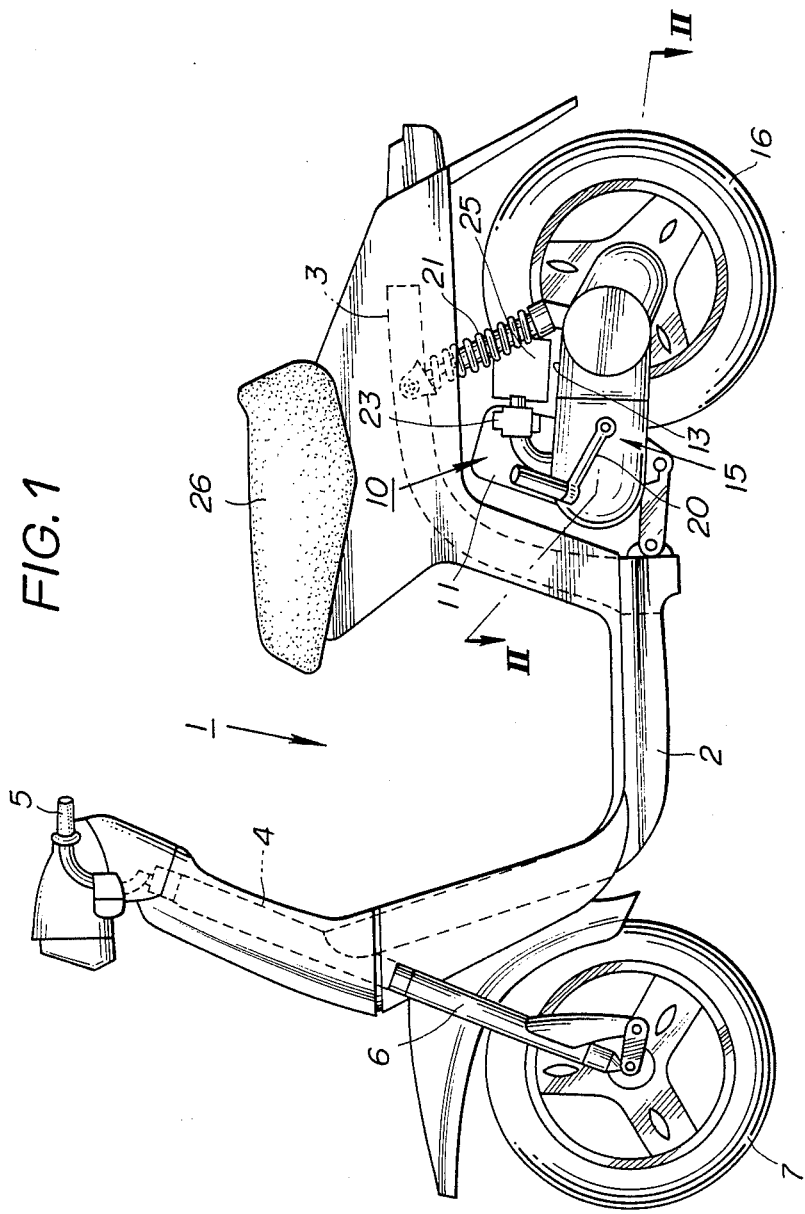
FIG. 1 is a side elevational view of a motorcycle having a cover structure for a power transmission device according to the present invention.

FIG. 1 shows a motorcycle 1 resembling a motor scooter, having a cover structure for a power transmission device according to the present invention. The motorcycle 1 comprises a main frame 2 which is of a substantially L shape in side elevation, and a rear frame 3 generally extending rearwardly and upwardly from the rear end of the main frame 2. The main frame 2 has a front upper end to which a head tube 4 is connected. A handlebar 5 is angularly movably supported on the upper end of the head tube 4. The handlebar 5 is coupled to a front fork 6 by which a front wheel 7 is rotatably supported. A power unit, generally denoted at 10, is supported on and extends rearwardly from the rear end of the main frame 2 in a horizontal direction. The power unit 10 comprises an engine 11, a casing 13 of the power transmission device, and a case cover 15 covering the casing 13. A rear wheel 16 is rotatably supported on the rear end of the power unit 10. A kick pedal arm 20 for starting the engine 11 is coupled to a side of the power unit 10. A spring-loaded damper 21 is connected between the power unit 10 and the rear frame 3. A carburetor 23 is connected to the engine 11 and an air cleaner 25. A rider's seat 26 is mounted on the rear frame 3.

Figure 2:
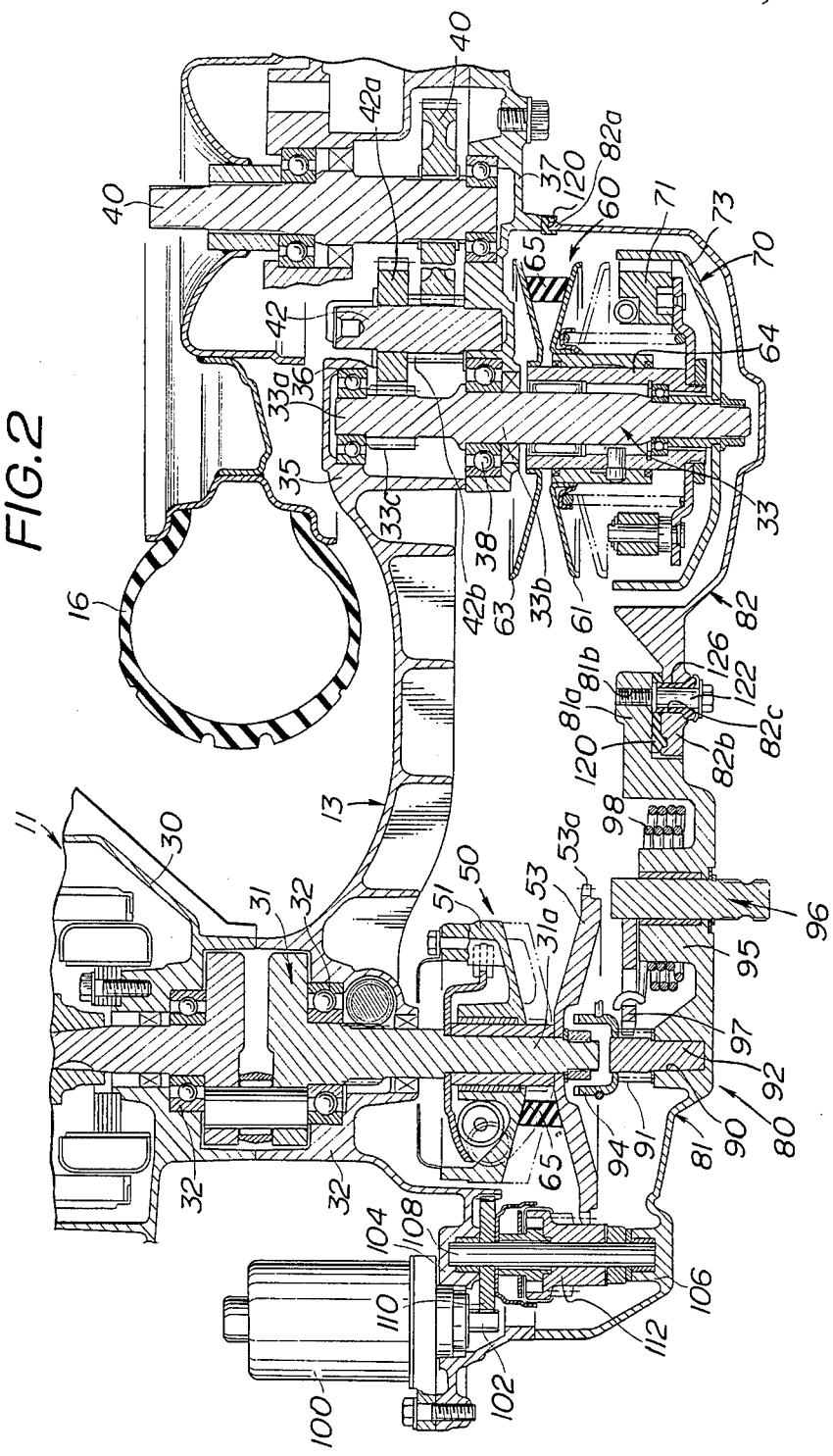
FIG. 2 is a cross-sectional view taken along line II—II of FIG. 1.

As shown in FIG. 2, a crankcase 30 is positioned downwardly of the engine 11 and houses a horizontal crankshaft 31 rotatably therein. The crankcase 30 includes a lefthand portion shared by a front portion of the casing 13. The crankshaft 31 has end journals rotatably supported by respective bearings 32, 32 mounted in the crankcase 30 and the casing 13, respectively.

The casing 13 extends longitudinally of the motorcycle 1. The casing 13 supports a driver shaft 31a rotatably in its front portion, the driver shaft 31a being one end of the crankshaft 31, and also supports a driven shaft 33 rotatably in its rear portion. The driven shaft 33 extends parallel to the driver shaft 31a. The driven shaft 33 has an end 33a near the rear wheel 16, the end 33a being rotatably supported by a bearing 36 in a boss 35 on the rear portion of the casing 13. The driven shaft 33 has an intermediate portion 33b rotatably supported by a bearing 38 on an axle support member 37 by which an axle 40 is rotatably supported. Between the driven shaft 33 and the axle 40, there is disposed an intermediate shaft 42 extending parallel to the driven shaft 33 and the axle 40 and having a gear 42a meshing with a gear 33c on the driven shaft 33. The axle 40 has a gear 40a in mesh with a gear 42b on the intermediate shaft 42.

The casing 13 accommodates therein a power transmission mechanism in the form of a belt-and-pulley mechanism operatively coupled between the driver shaft 31a and the driven shaft 33. The belt-and-pulley mechanism includes a driver pulley 50 having a movable member 51 positioned axially inwardly on the driver shaft 31a and a fixed member 53 positioned axially outwardly on the driver shaft 31a. The belt-and-pulley mechanism also includes a driven pulley 60 having a movable member 61 positioned axially outwardly on the driven shaft 33 and a fixed member 63 positioned axially inwardly on the driven shaft 33. The fixed member 63 of the driven pulley 60 has a hollow shaft 64 with its outer end supporting the clutch shoe 71 of a centrifugal clutch 70. The centrifugal clutch 70 includes a clutch drum 73 mounted on the outer end of the driven shaft 33. The rotative output power from the driver pulley 50 is transmitted to the driven pulley 60 by a V belt 65 trained therearound. When the speed of rotation of the hollow shaft 64 reaches a prescribed level, the clutch shoe 71 is spread radially outwardly into engagement with the inner circumferential surface of the clutch drum 73 to transmit the engine power to the driven shaft 33 and hence the axle 40.

Figure 3:
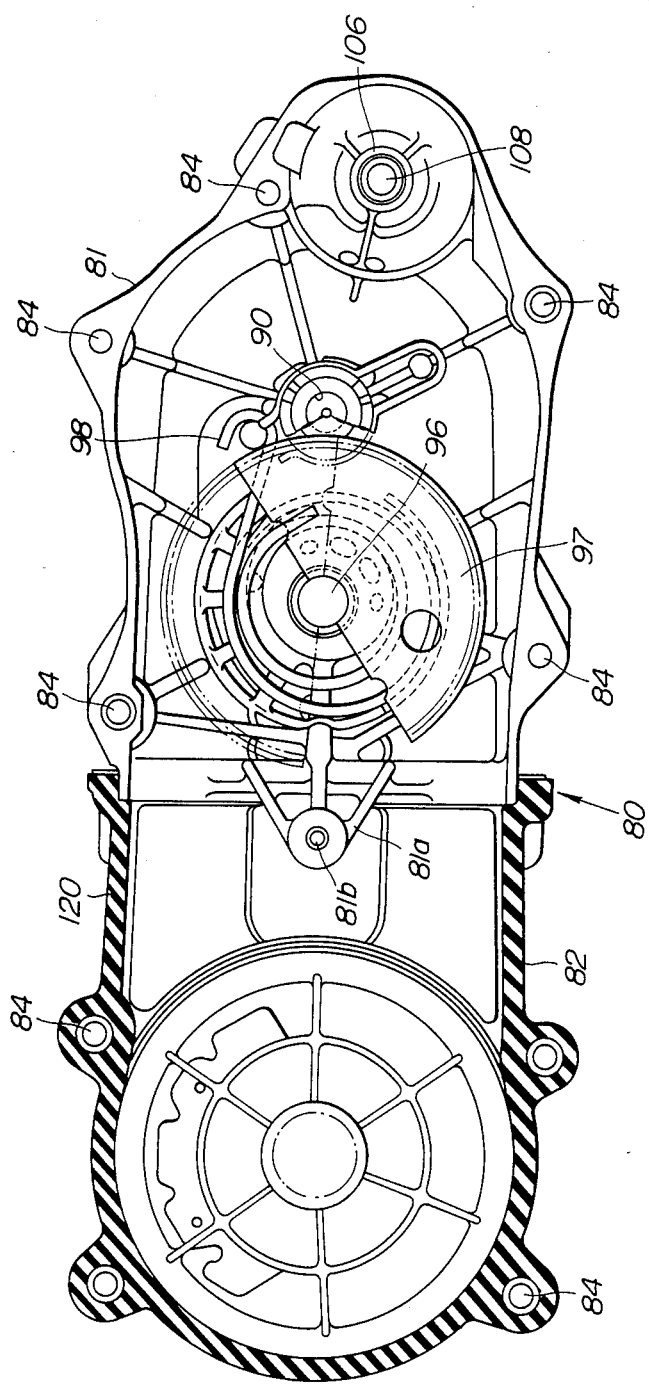
FIG. 3 is a view of the back of front and rear members of a case cover.

FIGS. 2 and 3 illustrate a case cover 80 for the casing 13 in detail. The case cover 80 comprises a front cover member 81 and a rear cover member 82, the front cover member 81 covering substantially the front half portion of the casing 13. When attaching the front cover member 81 to the casing 13, the front end of the front cover member 81 is held against the front end of the casing 13, and then the front cover member 81 is fastened firmly to the casing 13 by bolts (not shown) threaded in bolt holes 84 defined in a plurality of attachment flanges projecting from the outer periphery of the casing 13.

As illustrated in FIG. 2, a recess 90 is defined substantially centrally in the inner surface of the front cover member 81, and a pinion 91 has its shaft 92 rotatably fitted in the recess 90. The shaft 92 supports on its inner end remote from the recess 90 a starter coupling 94 for engaging the fixed member 53 of the driver pulley 50. The inner surface of the front cover member 81 also has a boss 95 disposed rearwardly of and adjacent to the recess 90. A kick starter spindle 96 is rotatably mounted in the boss 95. The kick starter spindle 96 supports on its inner end a starter gear 97 meshing with the pinion 91 and has its outer end projecting laterally out of the front cover member 81. The kick pedal arm 20 is secured to the outer projecting end of the kick starter spindle 96. A return spring 98 is disposed around the boss 95 in engagement with the starter gear 97 and the boss 95 for normally urging the kick pedal arm 20 to a returned position. The pinion 91, the boss 95, the kick starter spindle 96, the starter gear 97, the return spring 98, and the kick pedal arm 20 jointly constitute a kick starter for starting the engine 11. Since the front cover member 81 is securely coupled to the casing 13 with a sufficient degree of mechanical strength and rigidity, the kick starter can be mounted on the front cover member 81 of the case cover 80.

The casing 13 also accommodates a motor-driven engine starter mechanism in addition to the kick starter. As shown in FIG. 2, a starter motor 100 is mounted on the front end of the casing 13 and has its toothed output shaft 102 held in driving mesh with a driven gear 110 supported on a shaft 108 rotatably supported at its opposite ends by bosses 104, 106 on the front end portions of the casing 13 and the front cover member 81. The shaft 108 also supports a starter pinion 112 meshingly engageable with a gear 53a on the outer circumferential surface of the fixed member 53 of the driver pulley 50. Although both the kick starter and the motor-driven engine starter are shown as being housed in the casing 13, only one of them may be provided for starting the engine 11.

As illustrated in FIGS. 2 and 3, the rear cover member 82 of the case cover 80 covers the driven pulley 60 accommodated in the rear portion of the casing 13. For attaching the rear cover member 82 to the casing 13, a resilient body 120 of rubber or the like is applied to the peripheral edge 82a of the rear cover member 82 which will engage the rear portion of the casing 13 and the front end 82b of the rear cover member 82 which will engage the rear end 81a of the front cover member 81. Then, the rear cover member 82 is fastened to the casing 13 and the front cover member 81 by bolts 122. The front end 82b of the rear cover member 82 has a hole 82c defined therein, and the rear end 81a of the front cover member 81 has a threaded hole 81b defined therein. A rubber bushing 126 is fitted in the hole 82c over the bolt 122 which is threaded through the hole 82c into the threaded hole 81b to fasten the front cover member 81 to the rear cover member 82. With this arrangement, the rear cover member 82 is floatingly supported on the rear portion of the casing 13, so that the rear cover member 82 is coupled to the casing 13 in a vibro-isolating manner.

While the case cover 80 is illustrated as being comprised of two cover members, it may comprise three cover members.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

What is claimed is:

1. A power transmission for a two-wheeled vehicle and a cover structure for the power transmission, comprising:
 a casing having an open side;
 a driver shaft rotatably supported by said casing;
 a driven shaft rotatably supported by said casding and drivable by said driver shaft;
 a power transmission mechanism housed in said casing for transmitting rotative power from said driver shaft to said driven shaft;
 a starter mechanism housed in said casing and engageable with said driver shaft for starting an engine; and
 cover means covering said open side of the casing;
 said cover means including a plurality of cover members, one of which being securely coupled to said casing and supporting said starter mechanism and the remaining of which being coupled to said casing through a resilient member and covering said power transmission mechanism; and said cover means comprises a front cover member and a rear cover member, said front cover member having a threaded hole and said rear cover member having a hole and said front and rear cover members being fastened to each other by a bolt, and wherein a rubber bushing is fitted over said bolt in said hole of the rear cover member.

2. A power transmission for a two-wheeled vehicle and a cover structure for the power transmission, comprising:

a casing having an open side;
a driver shaft rotatably supported by said casing;
a driven shaft rotatably supported by said casing and drivable by said driver shaft;
a power transmission mechanism housed in said casing for transmitting rotative power from said driver shaft to said driven shaft;
a starter mechanism housed in said casing and engageable with driver shaft for starting an engine; and
cover means covering said open side of the casing;
said cover means including a plurality of cover members, one of which being securely coupled to said casing and supporting said starter mechanism and the remaining of which being coupled to said casing through a resilient member and covering said power transmission mechanism; and
said power transmission mechanism is a belt-and-pulley mechanism.

* * * * *

UNITED STATES PATENT AND TRADEMARK OFFICE
CERTIFICATE OF CORRECTION

PATENT NO. : 4,723,619

DATED : February 9, 1988

INVENTOR(S) : Sadashi YAMAMOTO et al

It is certified that error appears in the above-identified patent and that said Letters Patent is hereby corrected as shown below:

Column 4, line 57 (claim 1, line 6), change "casding" to --casing--.

Column 6, line 7, (claim 2, line 12), after "with" insert --said--.

Signed and Sealed this

Twelfth Day of July, 1988

Attest:

DONALD J. QUIGG

*Attesting Officer*   *Commissioner of Patents and Trademarks*